United States Patent

[11] 3,567,161

| [72] | Inventors | Earl G. Adams<br>2130 N.W. 13th St., 33125;<br>Edmund L. Eveleth, 10901 S.W. 180th St.,<br>Miami, Fla. 33157 |
|---|---|---|
| [21] | Appl. No. | 834,120 |
| [22] | Filed | June 17, 1969 |
| [45] | Patented | Mar. 2, 1971<br>Continuation-in-part of Ser. No. 813,253,<br>Apr. 3, 1969. |

[54] WEATHERVANING TIE-DOWN DEVICE FOR AIRCRAFT
10 Claims, 10 Drawing Figs.

[52] U.S. Cl. .................................................... 244/115
[51] Int. Cl. .................................................... B64f 1/12
[50] Field of Search........................................ 244/115,
116, 114; 269/58; 254/93; 187/8.41, 8.61, 8.62

[56] References Cited
UNITED STATES PATENTS

| 1,767,982 | 6/1930 | Hollister.................... | 254/93X |
| 2,464,731 | 3/1949 | Thompson................. | 187/8.61 |
| 2,483,078 | 9/1949 | Williams..................... | 244/115 |
| 3,094,192 | 6/1963 | McAlpine.................... | 187/8.41X |

FOREIGN PATENTS

| 613,723 | 12/1948 | Great Britain................ | 187/8.62 |

Primary Examiner—Milton Buchler
Assistant Examiner—Paul E. Sauberer
Attorney—Ernest H. Schmidt ABSTRACT: A weathervaning tiedown device for tricycle landing gear light aircraft is described, comprising an aircraft supporting framework and mechanism for elevating and lowering the supporting framework between a position at ground level, whereat an aircraft can be moved into place for tie down, and an elevated position, whereat it is free to rotate with the weathervaning aircraft. The supporting framework comprises a flat -T-shaped deck for placement for tie down of the aircraft. The elevating mechanism comprises a foundation in the form of a below-level trough receivable within which is the understructure of the framework in such a manner as to permit underside portions of the flat framework deck to rest flush against the ground when in lowered or ground level position.

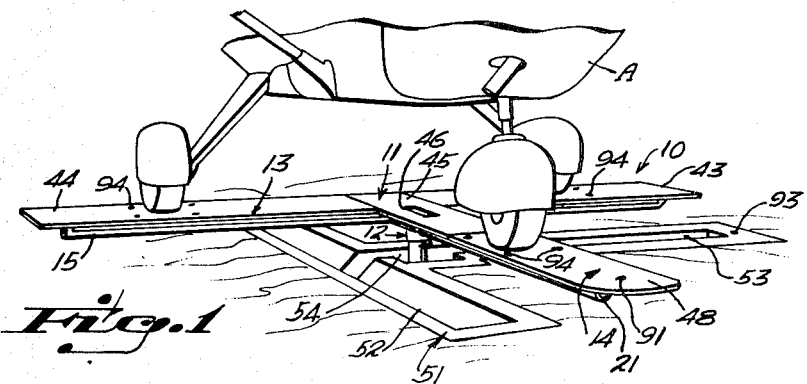
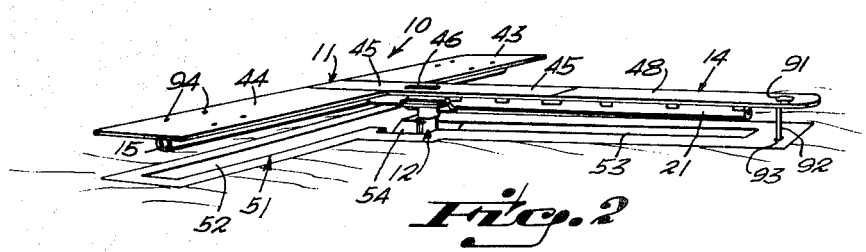
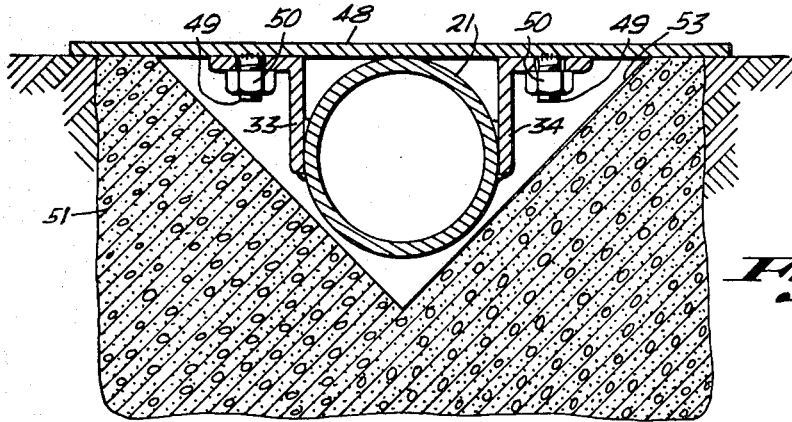
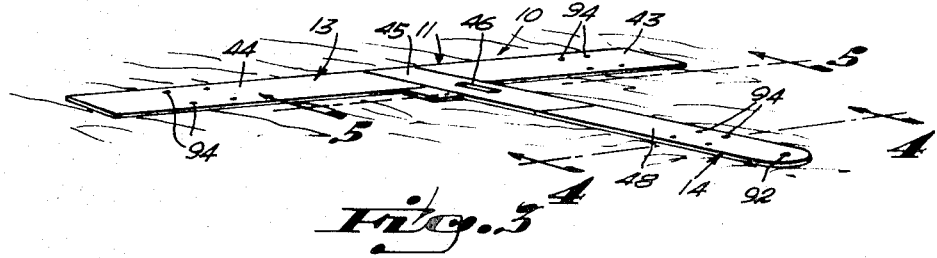

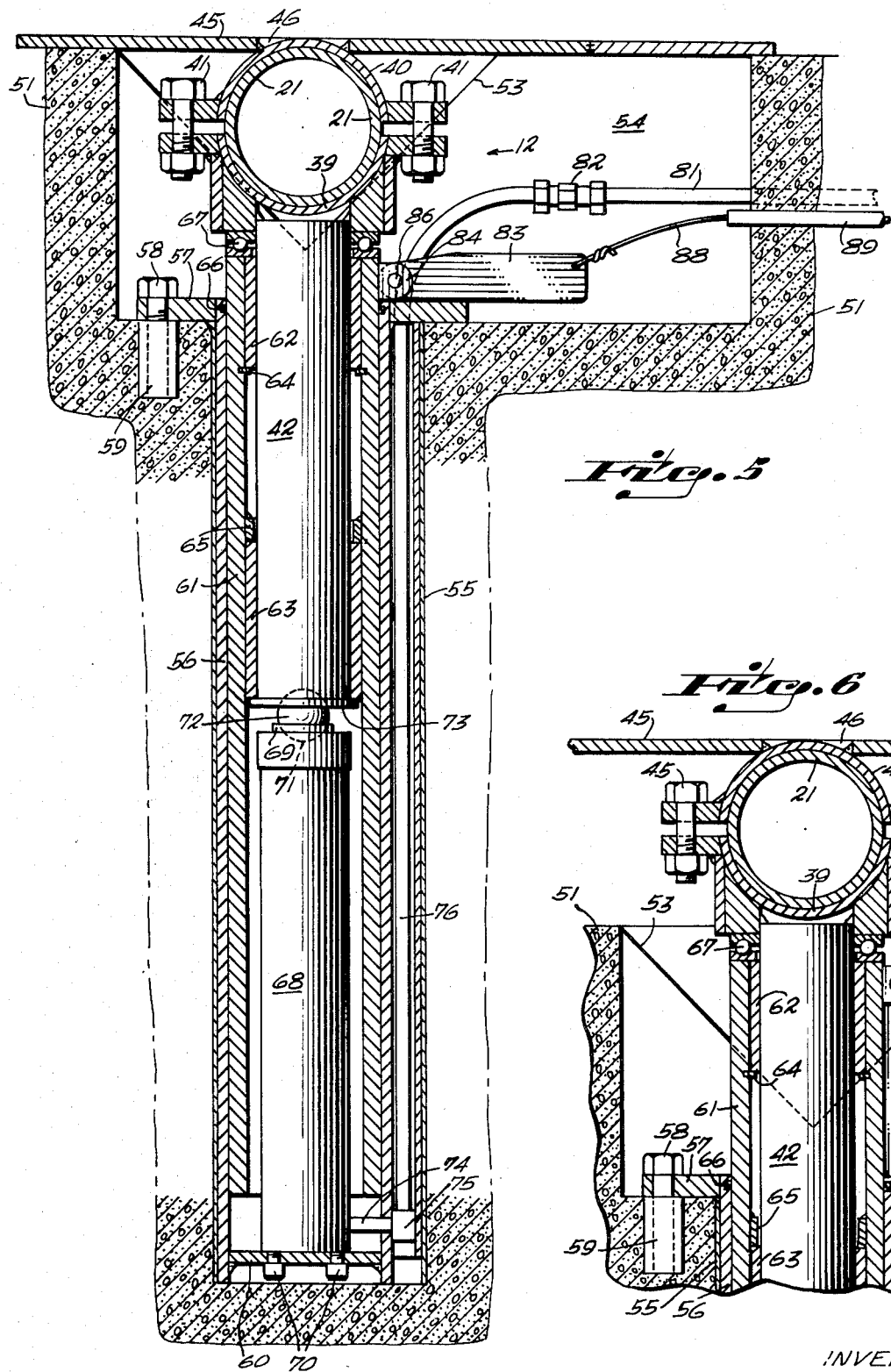

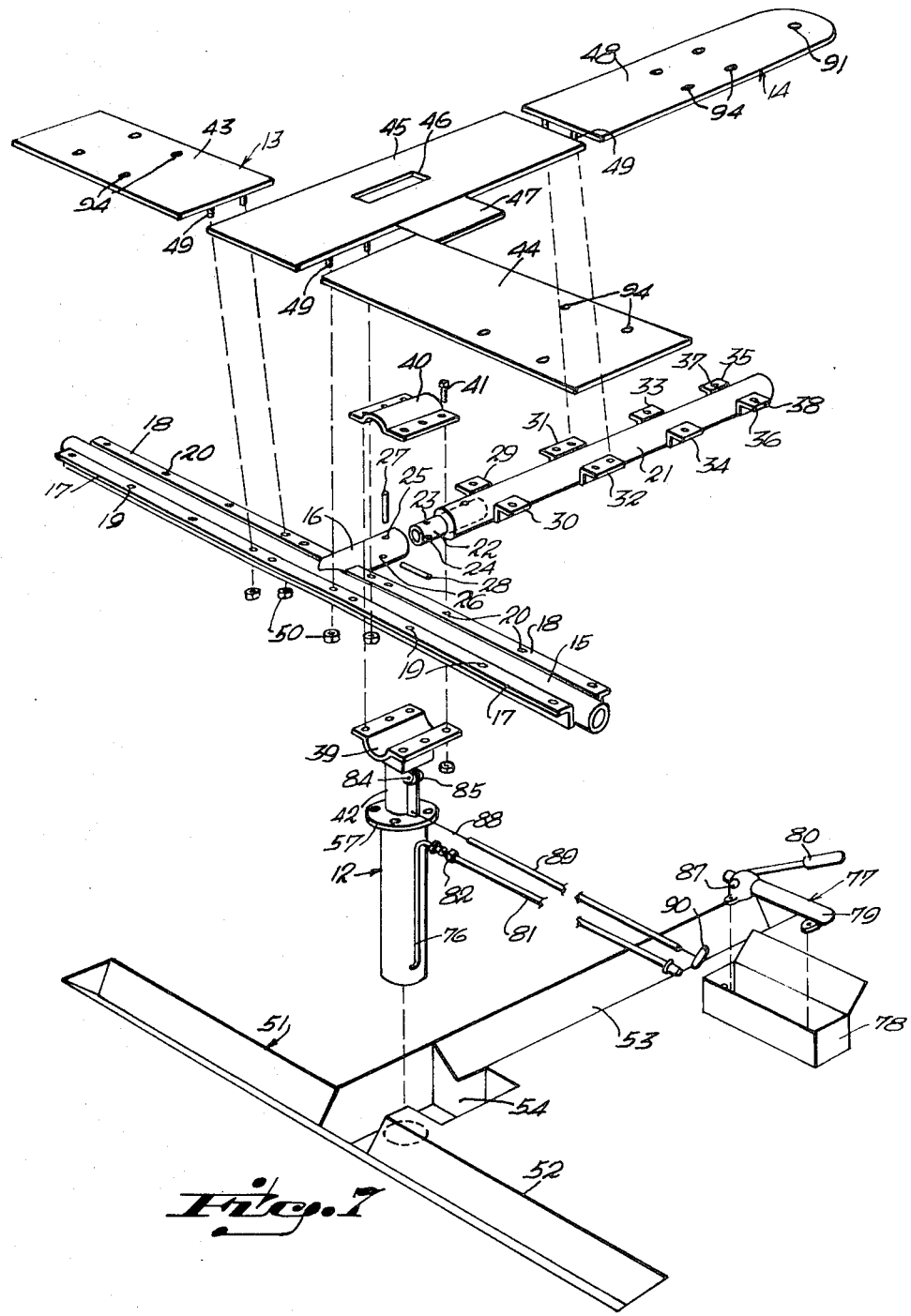

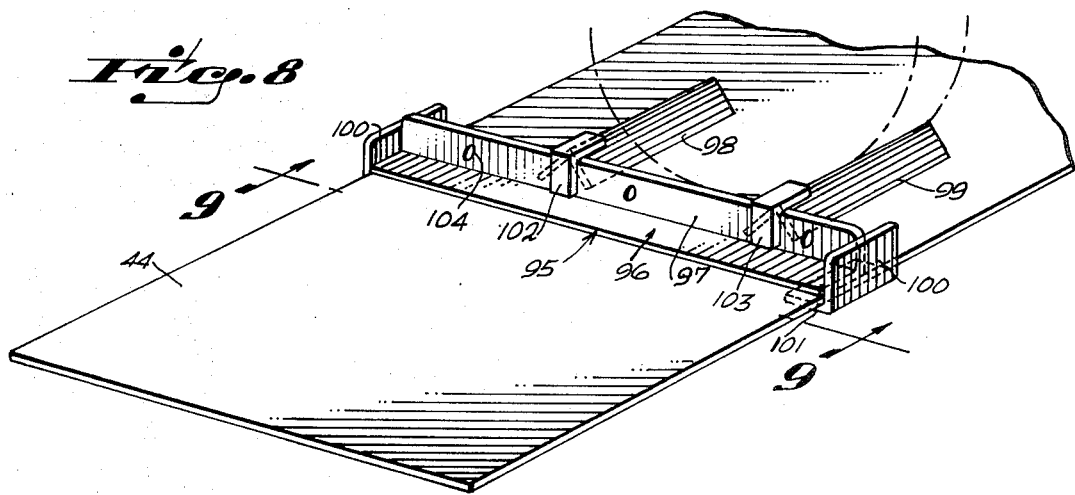
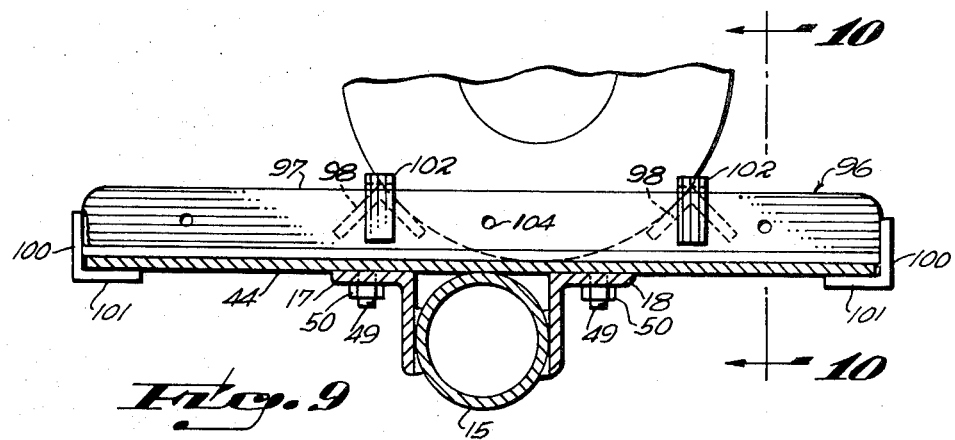
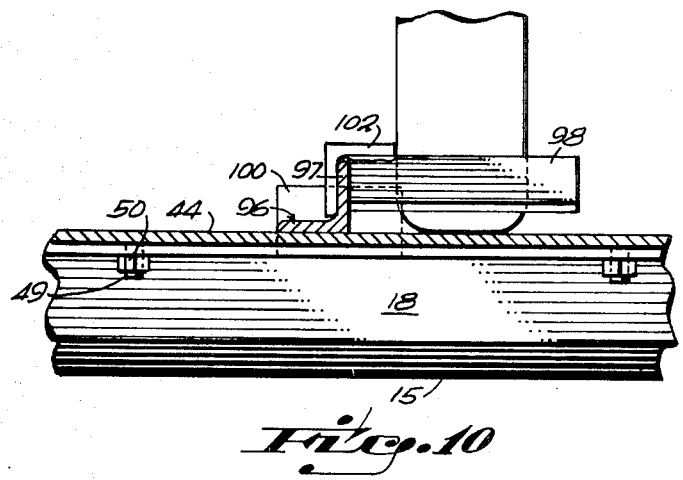

WEATHERVANING TIE-DOWN DEVICE FOR AIRCRAFT

This application is a continuation - in - part of application Ser. No. 813,253, filed Apr. 3, 1969.

In our U.S. Pat. application Ser. No. 813,253, filed Apr. 3, 1969, titled Aircraft Weathervaning Device, there is illustrated and described a tiedown structure for tricycle landing gear light aircraft which is journaled with respect to a fixed, vertically-arranged cylinder and movable axially between a first position at ground level and a second elevated position permitting free turning or "weathervaning" in response to prevailing winds to minimize the possibility of wind damage.

In the above-identified patent application, the rotatable aircraft supporting framework is in T-bar or H-bar configuration, being comprised of tubular structural members which, in the lowered positions for placement and tie-down of the aircraft thereupon prior to elevating, rest upon or very close to the ground whereat, although being only a few inches in height, they present a hazard to aircraft taxiing in the area, especially at night and under conditions of poor visibility.

It is, accordingly, the principal object of this invention to provide an improved weathervaning tiedown device for light aircraft of the character described which, in its lowered position, will be substantially flush with the ground surface and firm enough to support aircraft taxiing thereover, thereby eliminating any possible hazard to taxiing aircraft, and pedestrian and vehicular traffic.

A more particular object is to provide an improved weathervaning tiedown device of the character described comprising a T-shaped support structure framework of right-angular joined tubular members supporting from underneath deck plates or panels of substantially greater width than the outer diameters of the support tubes. When in its lowered position, the support assembly is receivable in a T-trough foundation provided in the ground, the trough being substantially V-shaped in cross section and of slightly lesser width than the width of the deck plates so that marginal edge portions of said deck plates will seat upon marginal portions of the foundation trough.

Another object of this invention is to provide an improved weathervaning tiedown device of the above nature including chock means adjustably positioned on an along outer end portions of the framework deck panels to facilitate securing an aircraft in place upon the device.

Yet another object of the invention is to provide an improved weathervaning tiedown device for tricycle landing gear light aircraft which will be simple in construction, easy to install and operate, neat in appearance and long-wearing and dependable in operation.

Other objects, features and advantages of the invention will be apparent from the following description when read with reference to the accompanying drawings. In the drawings, wherein like reference numerals denote corresponding parts throughout the several views:

FIG. 1 illustrates, in perspective, an aircraft weathervaning device embodying the invention, shown in use;

FIG. 2 is a perspective view of the aircraft weathervaning device installed in the ground and in elevated position, and further illustrates how it is locked in proper rotary position prior to being lowered to ground-level position;

FIG. 3 is a perspective view similar to that of FIG. 2, showing the device in lowered or ground level position;

FIG. 4 is a vertical cross-sectional view taken along the line 4-4 of FIG. 3 in the direction of the arrows and illustrating constructional details of the base frame member of the aircraft support structure;

FIG. 5 is a vertical cross-sectional view taken along the line 5-5 of FIG. 3 in the direction of the arrows and illustrating details of the elevating mechanism;

FIG. 6 is a partial vertical cross-sectional view, similar to that of FIG. 5 but showing the support structure locked in its elevated position;

FIG. 7 is an "exploded" view of the device, in perspective, illustrating constructional details thereof;

FIG. 8 illustrates, in oblique view, one of the wheel chocking devices adjustably positioned along end portions of the aircraft support deck for retaining the aircraft wheels in position;

FIG. 9 is a vertical cross-sectional view taken along the line 9-9 of FIG. 8 in the direction of the arrows and illustrating constructional details of the chock mechanism; and FIG. 10 is a vertical cross-sectional view taken along the line 10-10 of FIG. 9 in the direction of the arrows.

Referring now in detail to the drawings, the numeral 10 designates, generally, an aircraft weathervaning device for light aircraft having tricycle landing gear, shown in use in FIG. 1 with an aircraft A, partially illustrated. The aircraft weathervaning device 10 comprises a T-shaped support structure 11 and an elevating mechanism 12. The support structure 11 comprises a crossframe member 13 and a base frame member 14 extending perpendicularly outwardly of said crossframe member at a central position therealong. The crossframe member 13, as is best illustrated in FIG. 7, comprises a crosstube 15, which may be of steel pipe, for example, welded to which, at a central position therealong, is a short, perpendicularly outwardly-extending tubular socket 16, which will preferably be of the same pipe material as that of said crosstube. Welded along opposite side portions of the crosstube 15 are angle iron members 17 and 18, so arranged as to have their outwardly-extending flanges in a common plane tangential with the crosstube 15. The outwardly-extending flanges of the angle iron members 17 and 18 are provided with aligned, opposed pairs of openings 19, 20 for the purpose hereinafter appearing.

The base frame member 14 comprises a base tube 21, also preferably of steel pipe of the same size as that of the crosstube 15 and socket 16, within the inner end of which is welded or otherwise securely fixed an outwardly-projecting dowel tube 22 having substantially the same outer diameter as the inner diameter of the tubular socket 16 within which it is removably received. The dowel tube 22 is provided with rotatively-displaced and axially-staggered through openings 23, 24; and the socket 16 is provided with similarly arranged through openings 25, 26, which, when said dowel tube is received fully within the socket 16, align with the openings 23, 24, respectively, for the reception of lock pins 27, 28, respectively, for the purpose of securely maintaining the support structure framework in assembled relation. Welded in spaced relation along the base tube 21 are pairs of angle iron bracket members 29, 30; 31, 32; 33, 34 and 35, 36, each of said pairs having opposed, outwardly-extending flange portions lying in a common plane tangential with said base tube, said outwardly-extending flanges having pairs of through openings 37, 38 for the purpose hereinafter appearing.

The elevating mechanism 12 comprises a flanged saddle member 39 having a semicylindrical recess or seat, removably securable with respect to which is a flanged cap member 40 fixed by bolts 41 extending through openings in said flange. As illustrated in FIG. 5, the saddle member 39 and its associated cap member 40 serve to clamp about an inner end portion of the base tube 21 for secure adjustable attachment of the support structure 11 with respect to the elevating mechanism 12. As further illustrated in FIG. 5, the underside of the saddle member 39 has welded thereto one end of a downwardly-extending cylindrical post 42 for the purpose hereinafter appearing.

The support structure 11 further comprises a pair of substantially rectangular flat cross panels 43, 44, preferably of steel plate, a front base panel 45 having a rectangular opening 46, said front base panel being provided with a cover plate extension 47, and a rear base panel 48. The cross panels 43, 44, the front base panel 45 and the rear base panel 48 are all preferably of the same steel plate material and have welded against their undersides appropriately placed stud bolts 49 receivable in the through openings 19, 20 and 37, 38 in the angle iron members 17, 18 and the angle iron bracket members 29 through 36 for removable securement in place, as illustrated in FIGS. 2 and 4, by the use of nuts 50.

The aircraft weathervaning device 10, upon installation, is adapted when in its lowermost or down position, as illustrated in FIG. 3, to seat so that its T-shaped support structure 11 will be substantially flush against the ground (see also FIG. 4). To this end, a V-trough foundation 51, preferably of concrete, is provided in the ground, comprising a cross trough portion 52 and a base trough portion 53 adapted to receive respective support tubes 15 and 21 and associated mechanism for securing support panels 43, 44, 45, and 48. The foundation is also formed with a substantially rectangular recess 54 communicating with a base trough portion 53 near the inner end thereof, providing a chamber for housing portions of the elevating mechanism, as is hereinafter described. The concrete foundation 51 extends vertically downwardly at a position near the inner end of the base portion 53 thereof and opposite the substantially rectangular recess 54 to receive, cast in place, a vertical tubular sleeve 55 for the reception of the elevating mechanism 12 (see FIG. 5). The elevating mechanism 12, which is slidingly received within the cylindrical opening provided by the sleeve 55 imbedded in the foundation, comprises an outer cylindrical housing member 56 substantially coextensive in length with that of the sleeve 55 and of such outer diameter as to be slidingly received within said sleeve upon assembly of the aircraft weathervaning device to its prepared foundation. The upper end of the cylindrical housing 56 has welded or otherwise affixed thereto an outwardly-extending annular flange 57 provided with peripherally-spaced, through openings for the reception therethrough of bolts 58 (only when illustrated in FIGS. 5 and 6), for anchoring said housing in place with respect to the foundation by the use, for example, of expansion nuts 59. The lower end of the outer cylindrical housing 55 is sealed off with an end plate 60 welded or otherwise secured therein. Slidingly received within the cylindrical housing 56 is a tubular piston 61 coaxially secured within which are a pair of upper and intermediate sleeve bearings 62 and 63, respectively, held in place by internal snap rings 64 and push ring 65, respectively, engaging the underside of the sleeve bearing 62, and the upper end of the sleeve bearing 63, respectively. The upper end of the upper sleeve bearing 62 is substantially flush with the upper end of the tubular piston member 61. The outer cylindrical housing member 55, near the upper end thereof, is formed with an internal annular recess within which is seated an O-ring 66, serving as a gasket to seal against the tubular piston 61 and thereby prevent the entrance of moisture and dirt within said housing.

The flush upper end of the outer cylindrical housing 55 and the upper sleeve bearing 62 have seated thereagainst the underside of a thrust bearing 67. The internal diameters of the upper and lower sleeve bearings 62 and 63 are such as to rotatively receive therein the cylindrical post 42 rigidly secured to and extending downward from the flanged saddle member 39, hereinabove described. When fitted in place for rotative motion with respect to the tubular piston 61, the underside of the saddle member 39 surrounding the upper end of the post 42 seats against the top of the thrust bearing 67 which, together with the sleeve bearings 61 and 62, serve as antifriction means insuring substantially friction-free rotation of the saddle member assembly with respect to the tubular piston 61.

Means is provided for remotely elevating and lowering the rotatable post 42 and its associated mechanism including the aircraft support structure 11. To this end, there is coaxially secured within the lower end of the outer cylindrical housing 55 a hydraulic piston assembly 68 having a reciprocal piston 69. The piston assembly 68 may be one of any well-known commercial units, and is secured in place such as by means of bolts 70 extending through the lower end plate 60. The upper end of the piston 69 is formed with a semispherical recess 71 within which is seated a steel thrust ball 72. The upper end of the thrust ball 72 is received within the central opening of a washer 73 of lesser internal diameter than that of said thrust ball so that the thrust is imparted to said washer. The marginal edge portion of the washer 73 bears against the underside of the sleeve bearing 63 to impart thrust to the tubular piston 61.

The upper end of the thrust ball 72 projects into a semispherical recess in the lower end of the rotatable post 42.

The hydraulic fluid port 74, extending from the lower end of the hydraulic piston assembly 68, passes through a side opening in the outer cylindrical housing 56 whereat it communicates with a fitting 75 for connection with a hydraulic line 76 feeding hydraulic fluid under pressure. Remote control means is provided for raising the hydraulic piston assembly piston 69 and, thereby, the aircraft support structure 11, once an aircraft has been rolled into position thereon as illustrated in FIG. 1 and secured in place as herein below more particularly described. To this end, as illustrated in FIG. 7, a manually-operated hydraulic jack 77 is provided, being placed in a suitable enclosure 78 in the ground at a distance from the axis of rotation of the aircraft support structure 11 beyond the wing extent of any aircraft that might be used with the device. The hydraulic jack 77 may be of known construction, including a reservoir tank 79 for the hydraulic fluid contained in a sealed system and a pump actuating handle 80. The outlet orifice of the hydraulic jack unit connects, through an underground fluid pressure line 81 and connector union 82, to the hydraulic line 76. In operation, it will be understood that when the pump actuating handle 80 is reciprocated, fluid under pressure will be transferred through hydraulic lines 81 and 76 to the lower end of the hydraulic piston assembly 68, whereat is serves to raise the piston 69 which, in turn, raises the tubular piston 61. When the piston 61 has been raised to operating position, a lock bar 83, one end of which is swingably journaled between a pair of spaced ears 84 and 85 by means of a pivot pin 86, said ears being affixed to an extending outwardly of the tubular piston 61 at the upper end thereof, will have fallen into locking position, whereat its lower end will abuttingly engage an upper surface portion of the angular flange 57, thereby preventing any downward movement of said cylinder while the device is in use.

After the aircraft support structure 11 has been hydraulically raised and locked in place as described above, the pressure relief valve, indicated at 87 in FIG. 7, will be opened to minimize the possibility of leakage in the fluid system. When it is desired to lower the aircraft, the relief valve 87 will first be closed, and the pump-actuating handle 80 will be operated sufficiently to relieve the lock bar 83, after which said lock bar can be removed from locking position by means of a control wire 88 connected thereto at one end and extending underground through a protective tube 89 into the enclosure 78, a pull-knob 90 being provided at the remote end of said wire for this purpose. After the lock bar 83 has been disengaged, the hydraulic jack pressure relief valve 87 will be opened again to allow the weight of the aircraft to force the hydraulic fluid back into the reservoir 79 and thereby lower itself to ground position. As illustrated in FIGS. 2 and 3, the cover plate extension 47 of the front base panel 45 forming part of the aircraft support structure 11 is of such size and so positioned as to cover the rectangular recess 54 forming part of the concrete foundation structure 51.

As illustrated in FIG. 2, as a means for rotatively locating the support structure 11 so that it seats down into and upon its foundation as described above upon lowering of the unit, the outer end of the rear base panel 48 is provided with a through opening 91 for the reception of a headed locating rod 92 receivable in a vertical opening 93 provided in the foundation and appropriately located at the outer end of the V-trough portion 53 thereof. In order to facilitate securement of an aircraft in place prior to raising it for weathervaning on the support structure 11, the cross panels 43 and 44 and the rear base panel 48 are each provided with a plurality of through openings 94 near the outer ends thereof for the passage therethrough of tiedown ropes (not illustrated) for lashing the aircraft wheels in place.

FIGS. 8, 9 and 10 illustrate an adjustable chocking device for securing and tying down aircraft wheels with respect to the aircraft support structure 11. The cocking device, indicated generally by reference numeral 95, is operative to slide along the outer ends of the crosspanels 43 and 44, and the rear base panel 48 (only the cocking device associated with the crosspanel 44 being illustrated in FIGS. 8, 9 and 10, by way of example). Each wheel chock 95 comprises an angle-iron member 96 transversely seated upon the upper surface of the panel 44 and coextensive with the width thereof. The angle-iron member 96 has an upstanding sidewall portion 97 serving as a guide rail for a pair of front and rear wheel chocks 98 and 99, removably and adjustably positioned therealong. Means is provided for constraining the angle iron member 96 to parallel sliding motion along its associated crosspanel 44. To this end, the outer ends of the angle iron member 96 have welded thereagainst a pair of opposed, angle-iron retainer members 100, said angle-iron retainer members being so affixed with respect to the angle-iron member 96 as to have inwardly-projecting web wall portions 101 underlying marginal edge portions of the crosspanel 44. The wheel chocks 98 and 99, also in angle-iron form, extend perpendicularly inwardly of the upstanding wall portion 97 of the angle-iron member 96, with their apices directed upwardly, and are retained in place by short angle-iron members 102 and 103 welded against the outer ends of said angle-iron members. Holes 104 are provided in the upstanding wall portion 97 of the angle-iron member 96 to receive ropes for securing aircraft wheels with respect to the wheel chocks.

While we have illustrated and described herein only one form in which our invention can conveniently be embodied in practice, it is to be understood that this form is given by way of example only, and not in a limiting sense. The invention, in brief, comprises all the embodiments and limitations coming within the scope and spirit of the following claims.

We claim:

1. A weathervaning tiedown device for aircraft, comprising an aircraft supporting framework, mechanism for raising and lowering said supporting framework between a first position at ground level and a second position a few inches above ground level, said raising and lowering mechanism comprising a vertically disposed cylindrical housing member and a cylindrical elevating member telescopingly slidingly interfitted with respect to said cylindrical housing member, said raising and lowering mechanism further comprising antifriction bearing mechanism journaling said framework with respect to said elevating member for rotation in a horizontal plane, said framework comprising a cross frame member and a base frame member extending perpendicularly outwardly of said cross frame member at a central position therealong to present a T-shaped configuration, flat crosspanel deck means removably secured along and upon said crossframe member and having side portions extending outwardly of each side of said crossframe member, flat base panel deck means removably secured along and upon said base frame member and having side portions extending outwardly of each side of said base frame member, and manually operated remote control means for actuating said raising and lowering mechanism at a position beyond the radial extent with respect to said axis of rotation of said framework of the wings or other distal end portions of an aircraft supported by said framework.

2. A weathervaning tiedown device for aircraft as defined in claim 1, including a foundation having a T-shaped trough upper surface portions of which are substantially flush with ground level in the area in which the device is installed, an opening provided in said foundation for the reception of said raising and lowering mechanism, said mechanism and its associated aircraft supporting framework being so positioned with respect to said foundation and said T-shaped trough being of such size and configuration as to fully receive said cross frame member and said base frame member when said supporting framework is in ground level position with said side portions of said crosspanel deck means and said base panel deck means in overlying disposition with respect to upper surface portions of said foundation.

3. A weathervaning tiedown device for aircraft as defined in claim 2, including means for removably attaching said base frame member with respect to said crossframe member.

4. A weathervaning tiedown device for aircraft as defined in claim 3, wherein said crossmember and said base frame member are of tubular form.

5. A weathervaning aircraft tiedown device as defined in claim 4 wherein said attaching means comprises a tubular socket member secured to said cross frame member, a dowel member fixed within and extending outwardly of the inner end of said base frame member and receivable in said socket member, and cross pin lock means extending through aligned openings in said socket and dowel members.

6. A weathervaning aircraft tiedown device as defined in claim 4, wherein said crosspanel deck comprises a plurality of rectangular flat metal panel members substantially coextensive with said cross frame member, and a plurality of rectangular flat metal panel members substantially coextensive with said base frame member.

7. A weathervaning aircraft tiedown device as defined in claim 6, wherein said means for removably securing said metal panel members to said cross and base frame members comprises pairs of angle-iron members secured to and along said cross frame and base frame tubular members and stud bolt members secured to and extending downwardly of the undersides of said metal panel members and receivable in openings in outwardly-extending flange portions of said angle-iron members.

8. An aircraft weathervaning tiedown device as defined in claim 6, including mechanism for chocking aircraft wheels with respect to an outer end panel of said cross and base panels, said chocking mechanism comprising means constraining it to axial movement along its end panel to permit adjustment to wheel placement therealong.

9. An aircraft weathervaning tiedown device as defined in claim 8, wherein said chocking mechanism comprises a transverse member seated upon the upper surface of an coextensive with the width of its panel, retainer members secured to the ends of said transverse member and having web wall portions underlying marginal edge portions of its associated panel, a pair of front and rear wheel chocks extending perpendicularly outwardly of one side of said transverse member and resting upon said associated panel, and means constraining said wheel chocks to adjustable end-to-end positional movement along said transverse member.

10. An aircraft weathervaning tiedown device as defined in claim 9, wherein said chocking mechanism transverse member and said wheel chocks are fabricated of lengths of angle-iron stock.